United States Patent
Hart et al.

(10) Patent No.: US 9,663,923 B2
(45) Date of Patent: May 30, 2017

(54) VALVE STACK ASSEMBLY

(71) Applicant: DEERE & COMPANY, Moline, IL (US)

(72) Inventors: Casey J. Hart, Asbury, IA (US); Jordan Jorstad, Morris, IL (US)

(73) Assignee: DEERE & COMPANY, Moline, IL (US)

( * ) Notice: Subject to any disclaimer, the term of this patent is extended or adjusted under 35 U.S.C. 154(b) by 118 days.

(21) Appl. No.: 14/826,860

(22) Filed: Aug. 14, 2015

(65) Prior Publication Data
US 2017/0044738 A1    Feb. 16, 2017

(51) Int. Cl.
*E02F 9/22* (2006.01)
*F17D 3/01* (2006.01)
*F16L 55/07* (2006.01)
*E02F 3/76* (2006.01)
*E02F 9/20* (2006.01)

(52) U.S. Cl.
CPC .......... *E02F 9/2267* (2013.01); *E02F 3/7663* (2013.01); *E02F 9/2004* (2013.01); *F16L 55/07* (2013.01); *F17D 3/01* (2013.01)

(58) Field of Classification Search
CPC ............ Y10T 137/87885; E02F 9/2267; E02F 9/2282; E02F 3/7663; E02F 9/2004; F16L 55/07; F17D 3/01
See application file for complete search history.

(56) References Cited

U.S. PATENT DOCUMENTS

| 4,664,220 | A | 5/1987 | Ruhter et al. |
| 6,802,285 | B2 * | 10/2004 | Hefler .................. F01L 1/26 123/90.12 |
| 7,861,741 | B2 | 1/2011 | Kress |
| 9,494,171 | B2 * | 11/2016 | Kobayashi .......... F15B 13/0842 |
| 2004/0123824 | A1 * | 7/2004 | Afjeh .................... F01L 1/08 123/90.11 |
| 2015/0322975 | A1 * | 11/2015 | Kaufman ............... F15B 13/07 414/517 |
| 2016/0130782 | A1 | 5/2016 | Tolkacz et al. |
| 2016/0130783 | A1 | 5/2016 | Tolkacz et al. |

FOREIGN PATENT DOCUMENTS

EP    0439166 B1    7/1991

* cited by examiner

*Primary Examiner* — Faye M Fleming
(74) *Attorney, Agent, or Firm* — Taft Stettinius & Hollister LLP; Stephen F. Rost

(57) ABSTRACT

A valve stack assembly includes a first valve assembly having at least one valve and defining a first plurality of fluid passageways. The valve stack assembly also includes a second valve assembly having at least one valve and defining a second plurality of fluid passageways. An end block defines a third plurality of fluid passageways. The end block is mechanically and fluidly coupled to the first valve assembly and the second valve assembly, such that the third plurality of fluid passageways fluidly couples the first plurality of fluid passageways and the second plurality of fluid passageways to one another. The first valve assembly is disposed along a first valve axis and the second valve assembly is disposed along a second valve axis. The first valve axis is offset from the second valve axis.

20 Claims, 6 Drawing Sheets

VALVE STACK ASSEMBLY

FIELD OF THE DISCLOSURE

The present disclosure relates to a work machine, and in particular, to a hydraulic valve assembly for use with the work machine.

BACKGROUND OF THE DISCLOSURE

Work machines are commonly used in industries ranging from agriculture, construction, forestry, residential, and the like to give a user a mechanical advantage. In many work machines, a power system provides power to the work machine to move across an underlying surface. Some work machines utilize wheels to move across the underlying surface while others use tracks. In addition to moving across a surface, work machines often have at least one implement controlled by the user. The implement can range from a backhoe capable of displacing debris with a hydraulically controlled bucket, to a blade on a motor grader capable of manipulating underlying debris.

Work machines often have a hydraulic system to allow the user to control the implement or implements coupled thereto. The hydraulic system may be controlled through a plurality of valves that control the flow of hydraulic fluid between a pump, the implement, and a tank. In one configuration, the valves may be controlled through an electronic solenoid or motor. In this configuration, the user can manipulate an electronic input device to send a signal to the solenoid or motor to alter the valve position and control the implement. Electronic hydraulic controls, however, do not allow the user to directly feel the condition of the valve because the electronic input device is not mechanically coupled to the valve.

In a different configuration, the valve is controlled by mechanically linking a control knob to the valve. In this configuration, the user feels the inputs of the hydraulic system because of the direct mechanical linkage between the control knob and the valve. In many applications, spatial constraints do not allow the valve to be located proximate to the control knob. In these configurations, the control knob requires a bell-crank or other complex mechanical linkage to transfer the mechanical input from the control knob to the remotely located valve. The bell crank or other complex linkage make it difficult for the user to properly control and feel the position of the valve.

SUMMARY

In a first embodiment of the present disclosure, a valve stack assembly includes a first valve assembly having at least one valve and defining a first plurality of fluid passageways; a second valve assembly having at least one valve and defining a second plurality of fluid passageways; and an end block defining a third plurality of fluid passageways, the end block being mechanically and fluidly coupled to the first valve assembly and the second valve assembly, such that the third plurality of fluid passageways fluidly couples the first plurality of fluid passageways and the second plurality of fluid passageways to one another; wherein, the first valve assembly is disposed along a first valve axis and the second valve assembly is disposed along a second valve axis; further wherein, the first valve axis is offset from the second valve axis.

In one example of this embodiment, the at least one valve in each of the first and second valve assemblies has a first and a second side that are parallel to one another, wherein at least one fluid coupling channel is defined between the first and second side. In a second example, the first valve assembly, the end block, and the second valve assembly are mechanically coupled to one another to create a substantially U-shaped assembly. In a third example, the first valve assembly is spaced from the second valve assembly by a defined gap. In a fourth example, a spool assembly is disposed on a side of each valve. Moreover, each valve of the first valve assembly and the second valve assembly may have an actuator arm extending from the spool assembly towards the defined gap, each actuator arm defining a pivot at a distal end.

In this embodiment, the pivot of each valve in the first valve assembly defines a first pivot axis when the actuator arm is in an isolate position; further wherein the pivot of each valve in the second valve assembly defines a second pivot axis when the actuator arm is in the isolate position. In another example, the first pivot axis is offset from the second pivot axis. In yet another example, the first pivot axis is axially aligned with the second pivot axis. In a further example, the end block defines a pump orifice and a tank orifice, wherein the pump orifice and the tank orifice are fluidly coupled to the first plurality of fluid passageways and the second plurality of fluid passageways.

In a different embodiment, a work machine includes a chassis and a power system for powering the machine; a cabin coupled to the chassis, the cabin having a back portion and a front portion; at least one operator control disposed in the cabin for controlling a function of the machine; a valve stack assembly coupled to the operator control, the valve stack assembly including a first valve assembly having at least one valve and defining a first plurality of fluid passageways; a second valve assembly having at least one valve and defining a second plurality of fluid passageways; and an end block defining a third plurality of fluid passageways, the end block being mechanically and fluidly coupled to the first valve assembly and the second valve assembly, such that the third plurality of fluid passageways fluidly couples the first plurality of fluid passageways and the second plurality of fluid passageways to one another; wherein, the first valve assembly is disposed along a first valve axis and the second linear valve assembly is disposed along a second valve axis; further wherein, the first valve axis is offset from the second valve axis; at least one implement fluidly coupled to the valve, the implement being movable between a first position and a second position; wherein the implement is operably controlled between the first position and the second position by the operator control.

In a first example of this embodiment, the first valve assembly is disposed towards the back portion of the cabin and the second valve assembly is disposed towards the front portion of the cabin. In a second example, the first valve assembly and the second valve assembly are mechanically coupled to one side of the end block. In a third example, the first valve assembly extends from the end block to define a first width that terminates at a first end and the second valve assembly extends from the end block to define a second width that terminates at a second end, where the first width and second width are different from one another. In a fourth example, a floor of the cabin is provided such that at least one side of the floor tapers inwardly from the back portion to the front portion of the cabin.

In a fifth example, the valve stack assembly is mechanically coupled to the floor adjacent to the tapered side thereof. In a sixth example, the valve stack assembly is mechanically coupled outside of the cabin and to an underside of the floor.

In a seventh example of this embodiment, the first linear valve assembly has at least one more valve then the second linear valve assembly.

In a different embodiment, a work machine includes a chassis and a power system for powering the machine; a cabin coupled to the chassis, the cabin having a floor with side edges, a back portion and a front portion, wherein the side edges taper inwardly from the back portion to the front portion; at least one operator control disposed in the cabin for controlling a function of the machine; a first valve stack assembly coupled to the operator control, the valve stack assembly including a first valve assembly having at least one valve and defining a first plurality of fluid passageways; a second valve assembly having at least one valve and defining a second plurality of fluid passageways; and an end block defining a third plurality of fluid passageways, the end block being mechanically and fluidly coupled to the first valve assembly and the second valve assembly, such that the third plurality of fluid passageways fluidly couples the first plurality of fluid passageways and the second plurality of fluid passageways to one another; wherein, the first valve assembly defines a first valve axis and the second linear valve assembly defines a second valve axis; further wherein, the first valve axis is offset from and parallel to the second valve axis; at least one implement fluidly coupled to the valve, the implement being movable between a first position and a second position; wherein the implement is operably controlled from the first position to the second position by the at least one operator control.

In one example of this embodiment, a second valve stack assembly is included such that the first valve stack assembly and the second valve stack assembly are coupled to a location outside of the cabin and an underside portion of the floor, further wherein the end block of each of the first and second valve stack assembly is proximate to a center portion of the floor and the first and second linear valve assemblies of both the first and second valve stack assemblies are coupled proximate to the tapered side edges.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
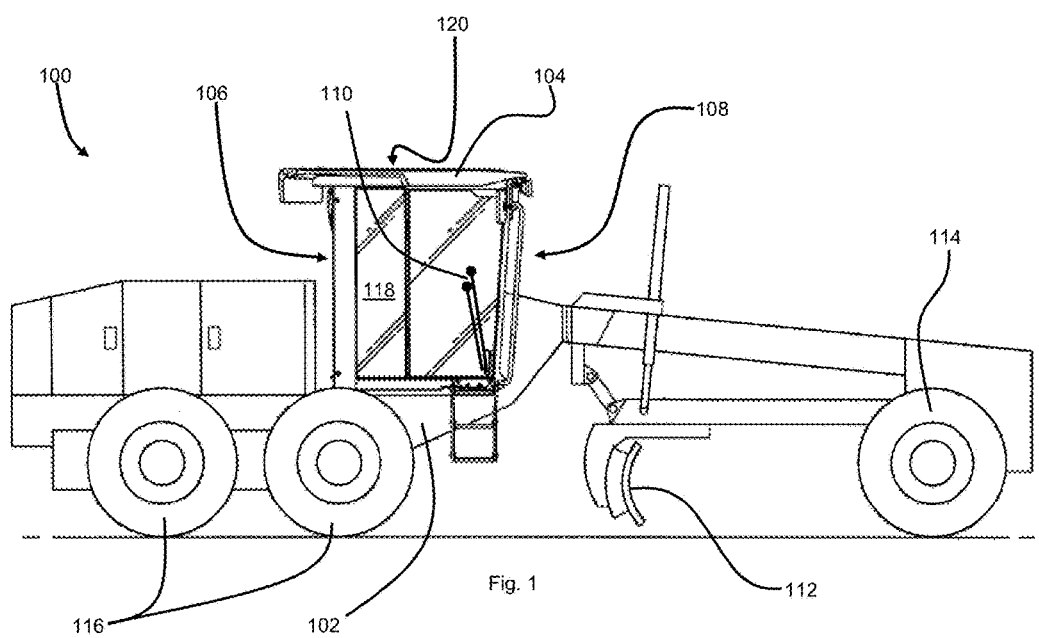
FIG. 1 is a side view of a work machine.

Referring to FIG. 1, a work machine 100 is shown. In one embodiment, the work machine 100 may be a motor grader. However, this disclosure is not limited to such a machine. Rather, the teachings of this disclosure may be applicable to any work machine including, but not limited to, any work machine that utilizes hydraulic controls.

The work machine 100 in FIG. 1 has a chassis 102 coupled to a front set of wheels 114 and a rear set of wheels 116. Also coupled to the chassis 102 may be a cabin 104 that has a back portion 106 and a front portion 108. The cabin 104 may also define an interior region where a user may control the work machine 100 with a plurality of controls.

In one aspect of the present disclosure, the plurality of controls may include hydraulic controls 110 that are manipulated by the user to control an implement 112. While hydraulic controls are described herein, other types of controls such as switches, levers, push buttons, a steering wheel, and any other control mechanism are considered herein as well. In the nonexclusive embodiment of FIG. 1, the implement 112 is the blade of the work machine 100. However, this disclosure is not limited to such an embodiment. This disclosure is equally applicable to any type of implement that may be part of a work machine and require control by the user. For example, any agricultural, construction, or forestry machine may utilize the teachings of this disclosure.

Figure 6:
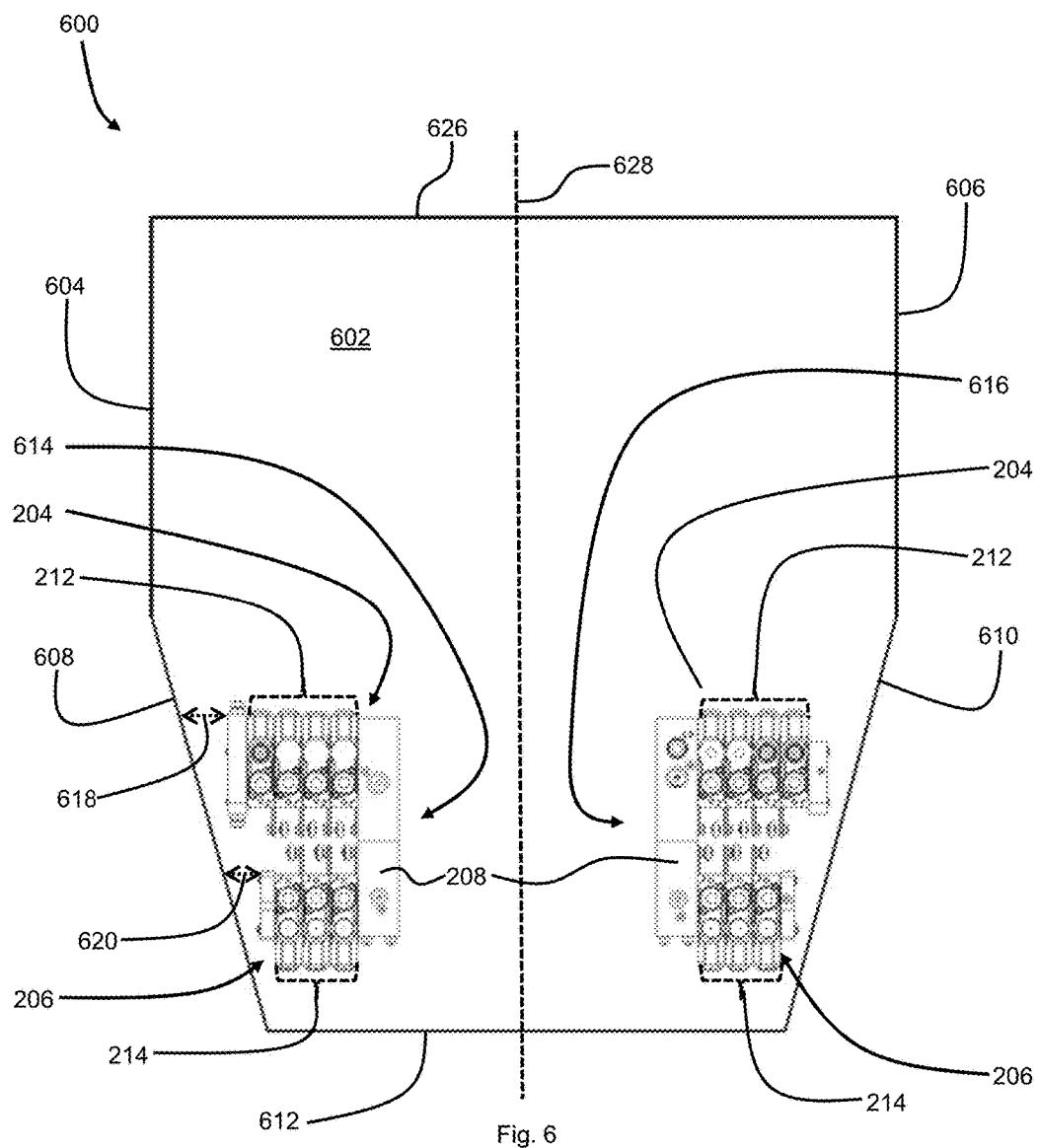
FIG. 6 is a bottom-side view of a floor for a cabin of the work machine of FIG. 1.

In one embodiment, the cabin 104 may have two sides 118, 120 that taper inwardly as they transition from the back portion 106 of the cabin 104 towards the front portion 108 (more clearly shown and described with respect to FIG. 6). The inward taper of the sides 118, 120 may improve the user's visibility of the underlying surface over which the work machine 100 is moving. The inwardly tapered sides 118, 120 may correspond with an inwardly tapered floor of the cabin 104.

Figure 2:
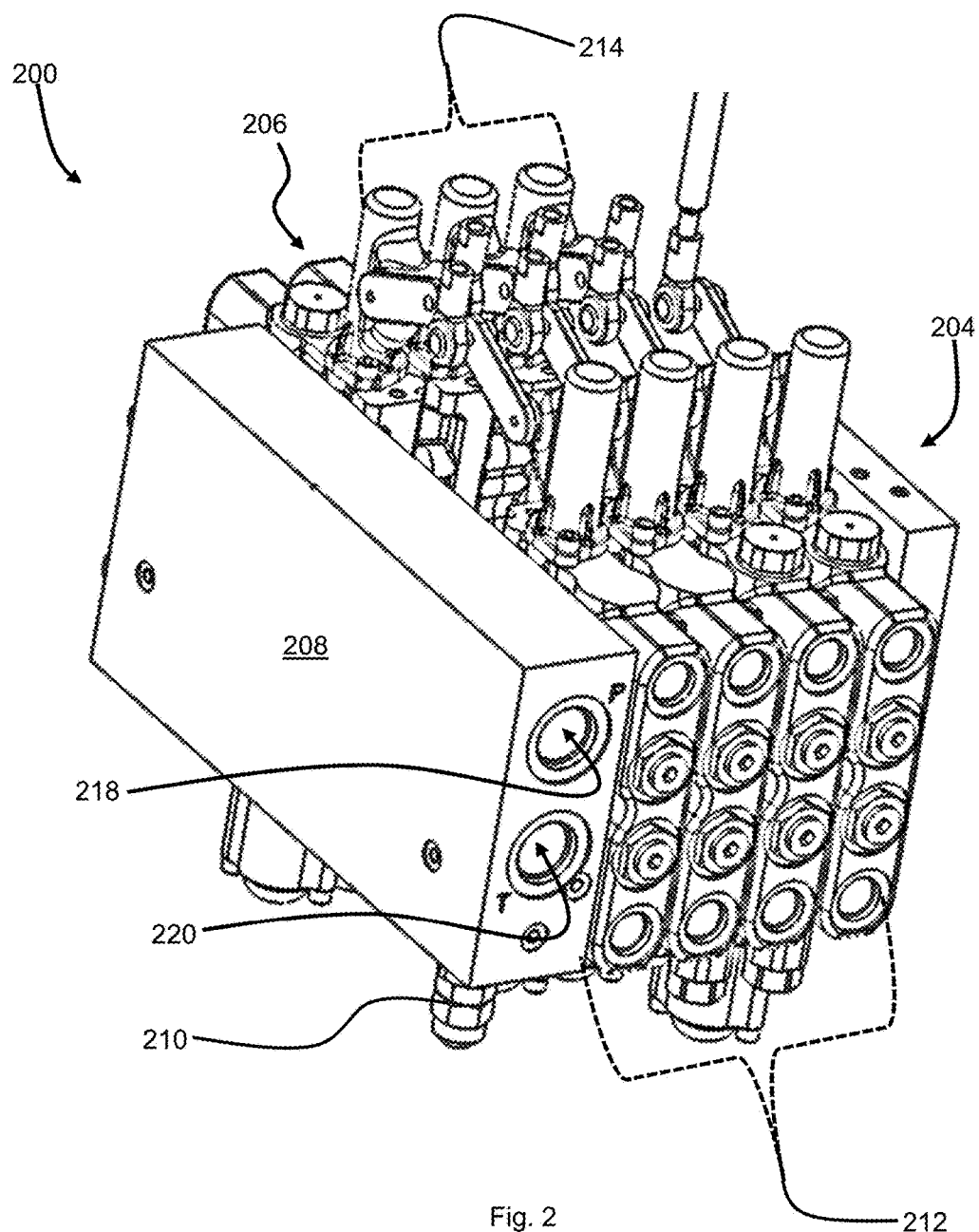
FIG. 2 is an elevated perspective view of one embodiment of a valve stack assembly.

Now referring to FIG. 2, a valve stack assembly 200 is shown. The valve stack assembly 200 may be a partially U-shaped assembly mechanically coupled to one of the plurality of controls in the cabin 104, e.g., the hydraulic controls 110. Further, the valve stack assembly 200 may control the hydraulic fluid supplied to the implement 112. In one embodiment, the implement 112 may have at least one hydraulic cylinder that moves relative to a hydraulic sleeve when the user adjusts the hydraulic controls 110. As the cylinder moves relative to the sleeve, the implement 112 may move. Further still, many hydraulic cylinders and sleeves may be controlled by the hydraulic controls 110, or any other of the plurality of controls, and this disclosure is not limited to any particular number of cylinders or sleeves. Other components requiring pressurized hydraulic fluid may also be controlled by the hydraulic controls 110 such as hydraulic motors or pumps to name a few.

The valve stack assembly 200 may have a first linear valve assembly 204 mechanically coupled to a second linear valve assembly 206 by an end block 208. The first and second linear valve assemblies 204, 206 may each be a substantially linear assembly of individual valves 300 (FIG. 3) coupled to one another, among other things. For example, in one embodiment the first linear valve assembly 204 may be a linear assembly of four valves 300 while the second linear valve assembly 206 may be a linear assembly of three valves 300. However, this disclosure is not limited to any particular number of individual valves 300 within the first or second linear valve assemblies 204, 206.

The first linear valve assembly 204 may define a first plurality of fluid passageways (not shown) and the second linear valve assembly 206 may define a second plurality of fluid passageways (not shown). Further, the end block 208 may define a third plurality of fluid passageways (not shown). In addition to mechanically coupling the linear valve assemblies 204, 206 to one another, the end block 208 may also fluidly couple the first plurality of fluid passageways with the second plurality of fluid passageways through the third plurality of fluid passageways defined in the end block 208.

In one embodiment, the first linear valve assembly 204 may have a first width 212 while the second linear valve assembly 206 may have a second width 214. The first width 212 may be greater than the second width 214. Further, the difference between the first width 212 and the second width 214 may allow the valve stack assembly 200 to become disposed along the tapered edge of the inwardly tapered floor of the cabin 104.

The end block 208 may also define a pump orifice 218 and a tank orifice 220. The pump orifice 218 may be fluidly coupled to a hydraulic pump by a hose (not shown). The hydraulic pump may provide pressurized fluid through the pump orifice 218 to one or more of the third plurality of fluid passageways defined in the end block 208. Accordingly, each of the first and second plurality of fluid passageways may also be partially supplied pressurized fluid via their fluid coupling with the end block 208. Similarly, the tank orifice 220 may be fluidly coupled to a hydraulic tank (not shown). The hydraulic tank may collect hydraulic fluid that is being exhausted from the implement 112 or other hydraulic system during use.

A load sense relief valve 210 may also be mechanically coupled to the end block 208 and hydraulically coupled to one or more of the third plurality of fluid passageways defined therein. The load sense relief valve 210 may provide an outlet for hydraulic fluid disposed in the end block 208 when the pressure of the hydraulic fluid is greater than a predefined maximum pressure allowable by the pressure relief valve 210.

Figure 3:
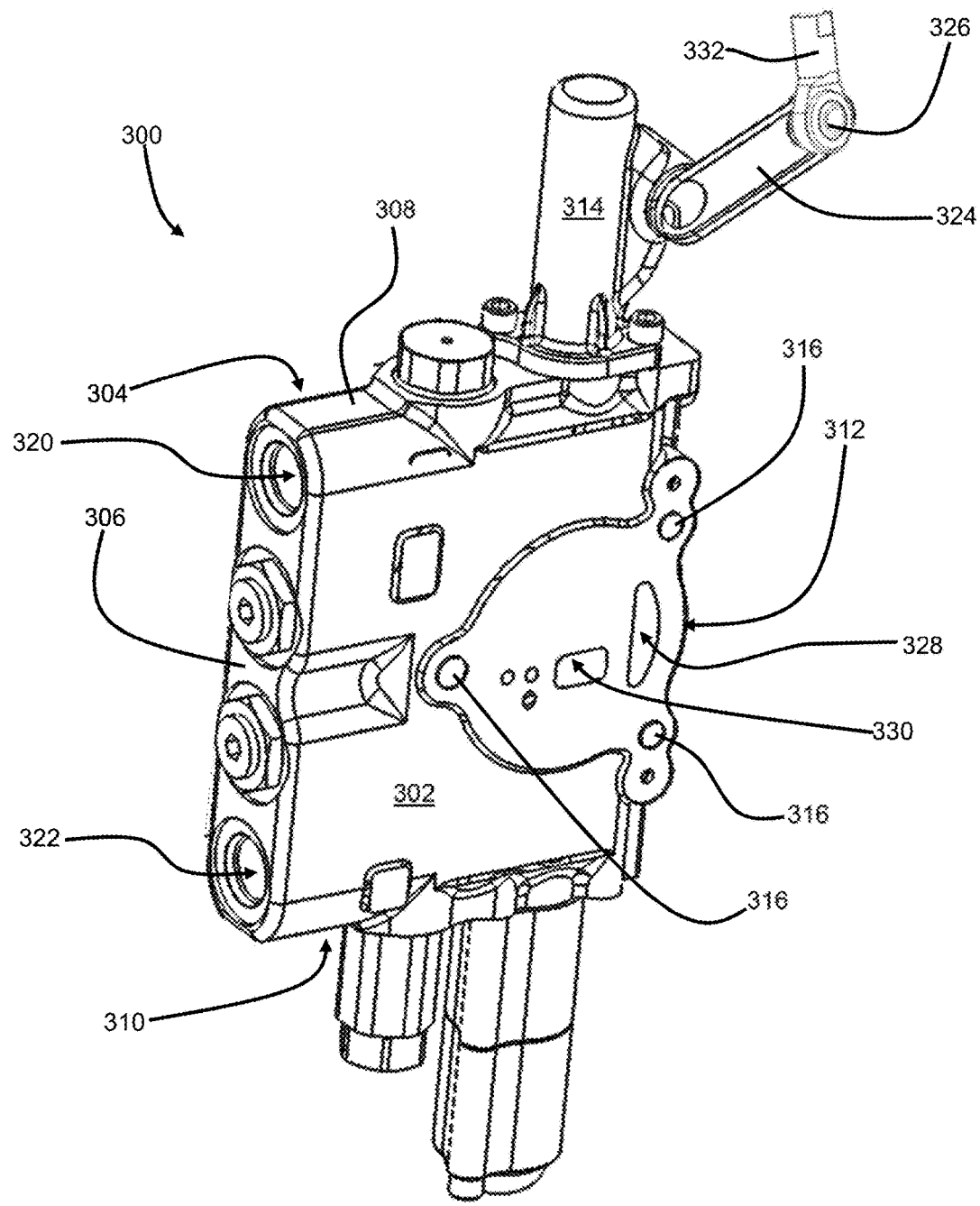
FIG. 3 is an isolated perspective view of one valve from the valve stack assembly of FIG. 2.

The first and second linear valve assemblies 204, 206 may be one or more individual valves 300 as shown in FIG. 3. Each of the individual valves 300 may be fluidly and mechanically coupled to one another. In one embodiment, valves 300 may be added or subtracted from the first and/or second linear valve assembly 204, 206 depending on the needs of the work machine 100 and the spatial constraints of a surrounding structure.

In one non-limiting embodiment, the valve stack assembly 200 may need to become disposed along a planar surface between a straight edge and an offset edge, the offset edge being angularly offset from the straight edge. In this spatial configuration, the end block 208 may be substantially aligned with the straight edge while the first and second linear valve assemblies 204, 206 may extend away from the end block 208 and towards the offset edge. The respective number of valves 300 in the first linear valve assembly 204 compared to the second linear valve assembly 206 may differ to allow for the valve stack assembly 200 to fit within the spatial constraints of the straight and angularly offset edge as explained in more detail regarding FIG. 6.

Each valve 300 may have six sides including a first side 302, a second side 304, a third side 306, a fourth side 308, a fifth side 310 and a sixth side 312. The first side 302 may be parallel to the second side 304. The first, and second sides 302, 304 may provide a surface that is aligned with another valve 300 (or other component) to provide a mechanical coupling surface that also facilitates fluid coupling between the valves 300 (and/or other component).

Further, the first plurality of fluid passageways may provide a passageway for fluid to flow from the first side 302 to the second side 304. More specifically, a return passageway 328 and a pump passageway 330 may be defined in each valve 300. The return passageway 328 may be fluidly coupled to the tank orifice 220 and the pump passageway 330 may be fluidly coupled to the pump orifice 218 when the valves 300 are arranged as shown in the valve stack assembly 200.

The valve 300 may also have a third side 306 that is perpendicular to both the first and second sides 302, 304. The third side 306 may have defined therein an actuator-out orifice 320 and an actuator-in orifice 322. Hydraulic fluid and pressure may be provided to the implement 112 through the actuator-in/out orifices 320, 322. Further, the hydraulic fluid and pressure provided to the implement 112 may be controlled by a spool (not shown) within the valve 300. For example, the actuator-out orifice 320 may provide hydraulic fluid and pressure to the implement 112 through a series of hoses (not shown) when the spool is in a supply position and not provide hydraulic fluid and pressure when the spool is in an isolate position. Similarly, the actuator-in orifice 322 may provide a passage for fluid to return to the valve 300 from the implement 112 and be routed to the hydraulic tank depending on the position of the spool. In short, the spool may direct the hydraulic fluid through different fluid passageways within the valve 300 depending on the spool's position to provide the proper hydraulic requirements to the implement 112.

The valve 300 may also have a fourth side 308 that is perpendicular to the first and second sides 302, 304, and perpendicular to the third side 306. Parallel to the fourth side 308 but positioned on a substantially opposite side of the valve 300, is the fifth side 310. Similarly, parallel to, but positioned on an opposite side of the valve 300 from the third side 306, is the sixth side 312.

A spool assembly cap 314 may be coupled to the valve 300 on the fourth side 308. The spool assembly cap 314 may substantially encompass a portion of the spool that controls the hydraulic fluid/pressure sent to the actuator-out orifice 320. Further, an actuator arm 324 may be coupled to the spool assembly cap 314 and mechanically coupled to the spool to transition the spool between a supply position and an isolate position. When the actuator arm 324 is in the supply position, it moves the spool to a position within the valve 300 that allows pressurized hydraulic fluid to be directed to the actuator-out orifice 320 and returned into the valve 300 at the actuator-in orifice 322. When the actuator arm 324 is in the isolate position, pressurized hydraulic fluid may be restricted from entering the actuator-out orifice 320.

In one nonexclusive embodiment, the actuator arm 324 may be mechanically coupled to the spool at one end, and provide a pivot 326 at the other end. The pivot 326 may provide for a coupling location for a connecting rod 332. Further, the hydraulic controls 110 may be directly coupled to the pivot 326 of the actuator arm 324 through the connecting rod 332 or some other coupling mechanism. The connecting rod 332 may provide a direct linkage between the hydraulic controls 110 and the actuator arm 324 so the user can control the valve 300 from the cabin 104 of the work machine 100. Further, the direct link from the actuator arm 324 to the hydraulic controls 110 allows the user to more accurately feel the position of the spool within the valve 300 and the hydraulic fluid flowing therethrough.

Figure 4:
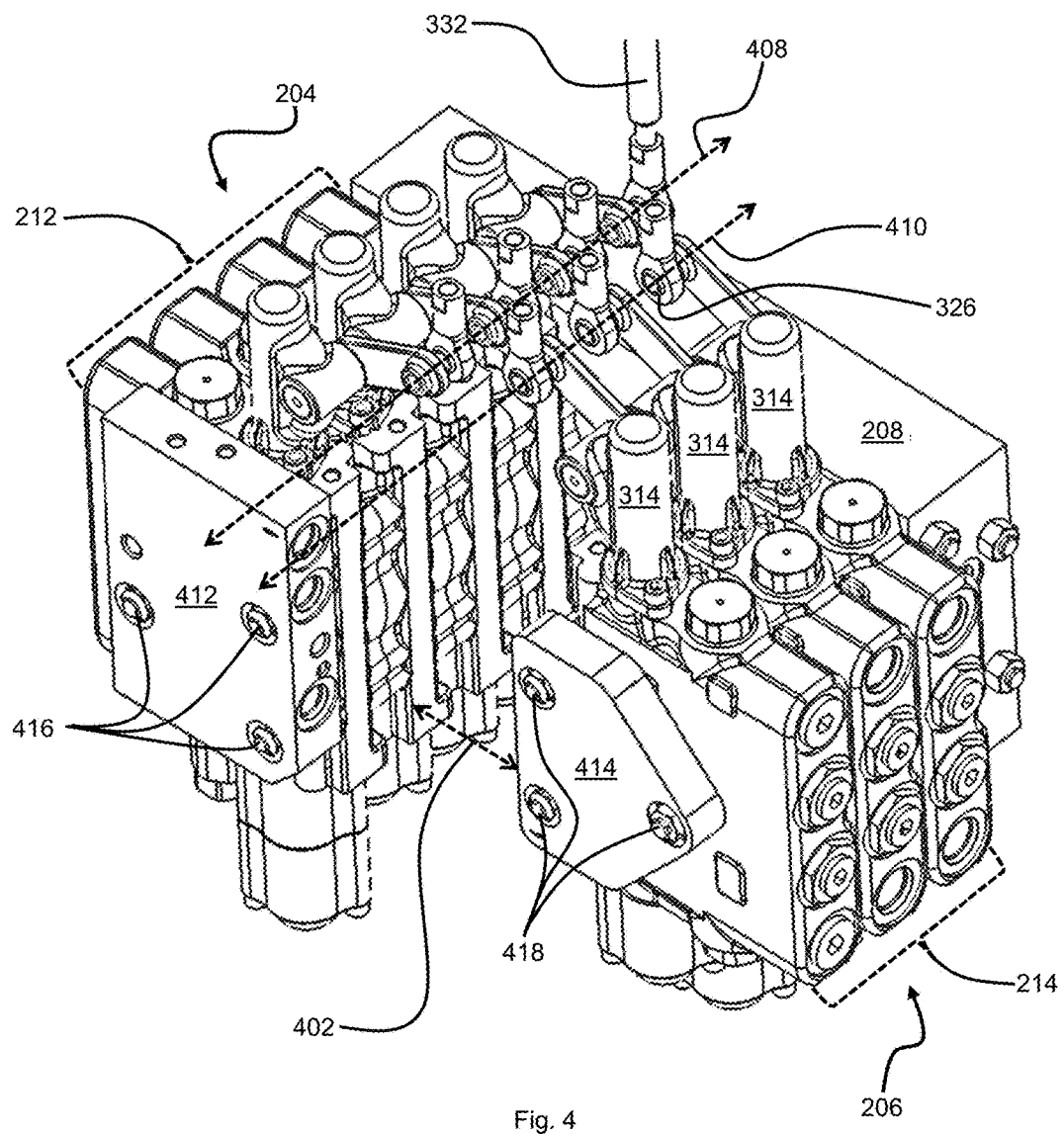
FIG. 4 is a different elevated perspective view of the valve stack assembly of FIG. 7.

Referring now to FIG. 4, a different view of the valve stack assembly 200 is shown. In the embodiment of FIG. 4, a center gap 402 is more clearly shown. The center gap 402 is the space between the first linear valve assembly 204 and the second linear valve assembly 206. The center gap 402 may be determined, in part, by the location at which the first and second linear valve assembly 204, 206 are coupled to the end block 208.

A first pivot axis 408 and a second pivot axis 410 are also shown in FIG. 4. The first pivot axis 408 may be defined at a location where each pivot 326 of the actuator arms 324 on the first linear valve assembly 204 are axially aligned with the first pivot axis 408 when the actuator arms 324 are in the isolate position. Similarly, the second pivot axis 410 may be defined at a location where each pivot 326 of the actuator arms 324 on the second linear valve assembly 206 are axially aligned with the second pivot axis 410 when the actuator arms 324 are in the isolate position.

In the embodiment of FIG. 4, the first pivot axis 408 and the second pivot axis 410 are offset from, and parallel to, one another. In this embodiment, the offset distance between the first and second pivot axis 408, 410 may allow for adequate clearance about the pivots 326. In one nonexclusive example, each actuator arm 324 may move in a way that does not allow the pivots 326 to contact one another when being transitioned between the isolate and supply positions. In this embodiment, the center gap 402 may be wide enough for the pivots 326 of the first linear valve assembly 204 to move without contacting the pivots 326 of the second linear valve assembly 206.

While the first pivot axis 408 and the second pivot axis 410 have been described as parallel to one another, this disclosure is not limited to such a configuration. In one non-limiting example the first and second pivot axis 408, 410 may be angularly offset from one another. Accordingly, both configurations where the first and second pivot axis 408, 410 are parallel to one another and angularly offset from one another are considered herein.

In a different embodiment, however, the center gap 402 may have a width such that the pivots 326 of the first linear valve assembly 204 axially align with the pivots of the second linear valve assembly 206 in their respective isolate position. In this embodiment, both the first pivot axis 408 and the second pivot axis 410 may be axially aligned with one another. Further, in this embodiment the pivots 326 and connecting rods 332 of each of the first and second linear valve assemblies 204, 206, are aligned to be disposed in a side-by-side arrangement without contacting one another.

A first end cap 412 and a second end cap 414 are also shown in FIG. 4. The first and second end caps 412, 414 may provide a fluid seal for the respective end valve 300 of the respective first or second linear valve assembly 204, 206. The first and second end caps 412, 414 may also provide a coupling base for a first plurality of coupling mechanisms 416 and a second plurality of coupling mechanisms 418.

Figure 5:
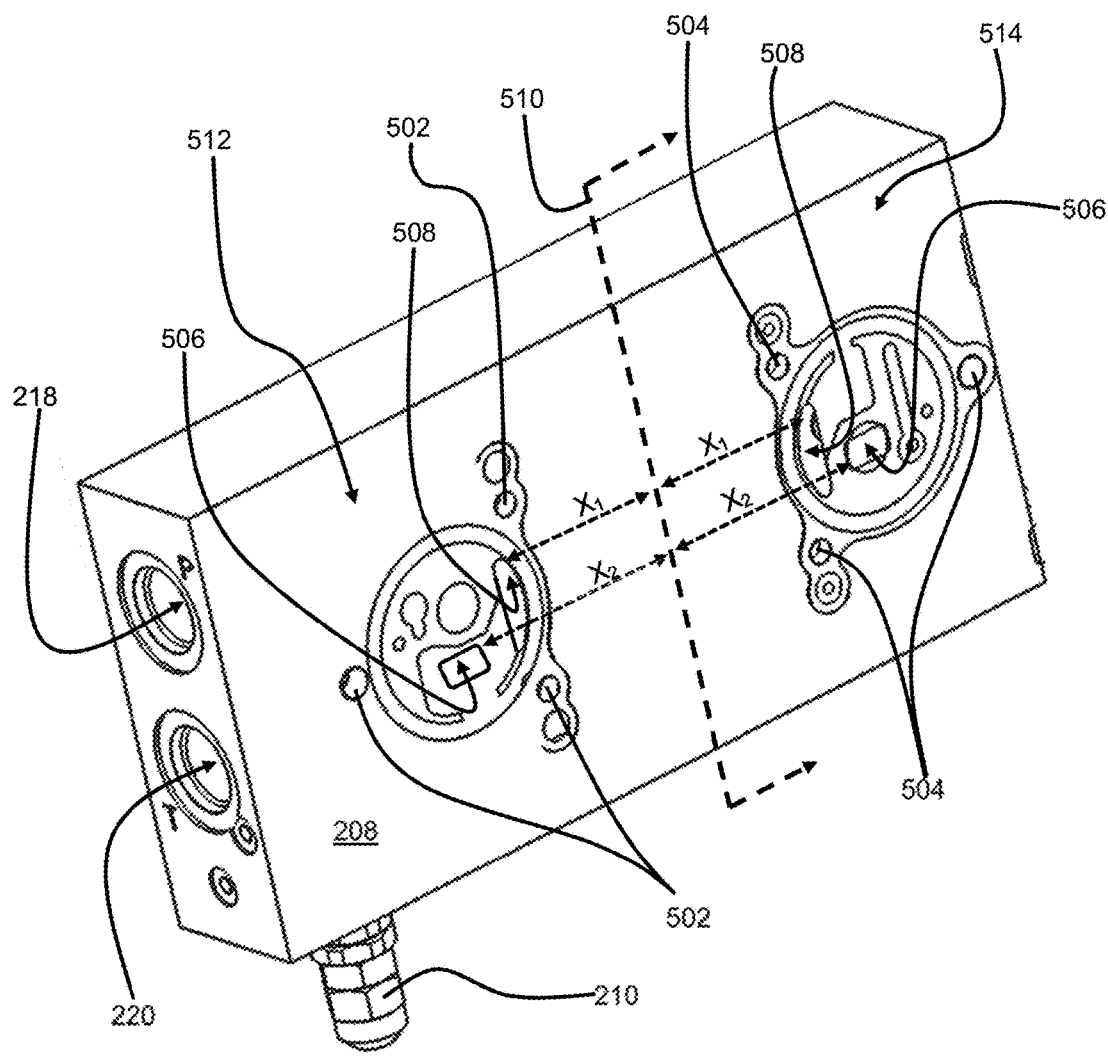
FIG. 5 is an elevated perspective view of an end block of the valve stack assembly of FIG. 2.

Referring now to FIG. 5, a perspective view of the end block 208 is shown with the first and second linear valve assemblies 204, 206 removed. More specifically, a first and second plurality of threaded partial through holes 502, 504 are shown defined in the end block 208. The first and second threaded partial through holes 502, 504 may be defined within the end block 208 at a location that does not fluidly interfere with any of the third plurality of fluid passageways. That is to say, while the first and second threaded partial through holes 502, 504 may be a partial through hole in the end block 208, they are spaced so they do not pass through any one of the third plurality of fluid passageways.

In one nonexclusive embodiment, the coupling mechanisms 416 may be bolts with bolt heads (not shown) on one end and bolt threads (not shown) on the other end. The bolts may be positioned through the end caps 412, 414 and through-holes 316 defined in each valve 300 within a respective linear valve assembly. The threads of the bolt may be removeably coupled to their respective threaded partial through holes 502, 504 of the end block 208. As the bolts are rotated to further engage the threads of the bolt with the respective threaded partial through hole 502, 504, the bolt head may provide a force pulling the end caps 412, 414 towards the end block 208. As the bolts are tightened, the end caps 412, 414 may compress each valve 300 within the respective linear valve assembly between the respective end cap 412, 414 and the end block 208. The compressive force provided by the bolts may be sufficient to both mechanically and fluidly couple each valve 300 within the respective linear valve assembly to one another while also fluidly and mechanically coupling the respective end caps 412, 414 and the end block 208 to the respective linear valve assembly 204, 206. In one embodiment, O-rings or other gaskets may be used between each of the valves 300 and/or the valve 300 and the first end cap 412, the second end cap 414, or the end block 208.

Further, the third plurality of fluid passageways are more clearly shown in FIG. 5. The third plurality of fluid passageways may have a cross pump passageway 506 and a return tank passageway 508 among others. The cross pump passageway 506 may be fluidly coupled to the pump orifice 218 but fluidly isolated from the return tank passageway 508. Similarly, the return tank passageway 508 may be fluidly coupled to the tank orifice 220 but fluidly isolated from the cross pump passageway 506. Both the cross pump, passageway 506 and the return tank passageway 508 may be defined cavities within the end block 208.

One aspect of the embodiment shown in FIG. 5 is the substantially mirrored or otherwise rotated layout of the second plurality of threaded partial through holes 504 compared to the first plurality of threaded partial through holes 502. More specifically, a mirror plane 510 illustrates one example of the relationship between a first linear valve assembly base 512 and a second linear valve assembly base 514. The first and second bases 512, 514 may provide the mechanical and fluid coupling locations for the first and second linear valve assemblies 204, 206. In one embodiment, the return tank passageway 508 of the first base 512 may be a distance $X_1$ on a first side from the mirror plane 510. Similarly, the return tank passageway 508 of the second base 514 may be the distance $X_1$ on a second side from the mirror plane 510. Alternatively, the cross pump passageway 506 of the first base 512 and the second base 514 may be a distance $X_2$ from the mirror plane 510 on opposing sides thereof.

In one embodiment, the orientation of the first and second bases 512, 514 allows the actuator arms 324 of the opposing linear valve assemblies 204, 206 to extend towards each other. That is to say, one linear valve assembly may be coupled to the end block 208 after being rotated 180 degrees lengthwise relative to the other linear valve assembly.

Referring now to FIG. 6, a bottom-side or underneath view 600 of the cabin 104 is shown. More specifically, the bottom side of a floor 602 of the cabin 104 is outlined. The floor 602 may have a back side 626 disposed near the back portion 106, first and second side edges 604, 606, first and second tapered edges 608, 610, and a front edge 612 disposed near the front portion 108. The first and second side edges 604, 606 may be parallel to one another and extend away from the back side 626 until they reach the first and second tapered edges 608, 610. The first and second tapered edges 608, 610 may taper inwardly towards one another as they approach the front edge 612.

A first and second valve stack assembly 614, 616 are also shown in FIG. 6. The first and second valve stack assemblies 614, 616 each substantially incorporate the features described above for the valve stack assembly 200. Accordingly, these features are considered incorporated into each of the first and second valve stack assemblies 614, 616. In one embodiment, the end block 208 of both the first and second valve stack assemblies 614, 616 may be positioned proximate to a center line 628 of the floor 602. Further, the first and second linear valve assemblies 204, 206 of each respective valve stack assembly 614, 616 may extend away from the end block 208 and towards the respective tapered edge 608, 610.

The first and second widths 212, 214 of the respective first and second valve stack assembly 614, 616 may correlate with the respective first and second tapered edge 608, 610. In one non-limiting example, the first tapered edge 608 may be a first distance 618 from the first linear valve assembly 204 and the first tapered edge 608 may be a second distance 620 from the second linear valve assembly 206.

In one non-limiting example, the first linear valve assembly 204 may include one more valve 300 then the second linear valve assembly 206. The different number of valves 300 in the first linear valve assembly 204 compared to the second linear valve assembly 206 may allow the first and second distances 618, 620 to be the same. I.e., the removed valve 300 provides a reduction in width in the second linear valve assembly 206 relative to the first linear valve assembly 204 that correlates with the reduction in available floor space created by the tapered edge 610.

While altering the first and second width 212, 214 by removing one valve 300 has been described above, this disclosure is not limited to such a configuration. More specifically, 2 or more valves 300 could be removed from one of the first or second linear valve assemblies 204, 206 to accommodate different spatial or other restrictions. Further, the first and second linear valve assemblies 204, 206 could each have the same number of valves 300.

The first and second valve stack assemblies 614, 616 may be mechanically coupled to the floor 602 or any other structural element of the work machine 100. In one nonexclusive embodiment, the end block 208 may provide for a coupling location to couple each stack assembly 614, 616 to the floor 602 and/or other structural element along the respective tapered edge 608, 610. In one embodiment, the end block 208 may define partial through holes (not shown) along portions of the end block 208 adjacent to the floor 602 or other structural element. The partial through holes may be mechanically coupled to couplers or fasteners, such as bolts, that hold each stack assembly 614, 616 in its proper respective position.

In a further embodiment, the coupling locations of the first and second linear valve assemblies 204, 206 to the end block 208 may allow for the hydraulic controls 110 and connection rods 332 to be substantially linearly aligned with one another. More specifically, in one embodiment, all of the pivots 326 of the actuator arms 324 have coaxial first and second pivot axes 408, 410, which allows connecting rods 332 to be aligned in a substantially linear arrangement relative to one another. That is to say, the connecting rods 332 may be in linear alignment with one another even though the first, and second linear valve assemblies 204, 206 are not. This may allow the hydraulic controls 110 to be directly coupled to the valves 300 through the connecting rods 332 in a linear arrangement even though the valves 300 are in a partially U-shaped assembly.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A valve stack assembly, comprising:
   a first valve assembly having at least one valve and defining a first plurality of fluid passageways;
   a second valve assembly having at least one valve and defining a second plurality of fluid passageways; and
   an end block defining a third plurality of fluid passageways, the end block being mechanically and fluidly coupled to the first valve assembly and the second valve assembly, such that the third plurality of fluid passageways fluidly couples the first plurality of fluid passageways and the second plurality of fluid passageways to one another;
   wherein, the first valve assembly is disposed along a first valve axis and the second valve assembly is disposed along a second valve axis;
   further wherein, the first valve axis is offset from the second valve axis.

2. The valve stack assembly of claim 1, wherein the at least one valve in each of the first and second valve assemblies has a first and a second side that are parallel to one another, wherein at least one fluid coupling channel is defined between the first and second side.

3. The valve stack assembly of claim 1, wherein the first valve assembly, the end block, and the second, valve assembly are mechanically coupled to one another to create a substantially U-shaped assembly.

4. The valve stack assembly of claim 1, wherein the first valve assembly is spaced from the second valve assembly by a defined gap.

5. The valve stack assembly of claim 4, further comprising a spool assembly disposed on a side of each valve.

6. The valve stack assembly of claim 5, wherein each valve of the first valve assembly and the second valve assembly has an actuator arm extending from the spool assembly towards the defined gap, each actuator arm defining a pivot at a distal end.

7. The valve stack assembly of claim 6, wherein the pivot of each valve in the first valve assembly defines a first pivot axis when the actuator arm is in an isolate position;
   further wherein the pivot of each valve in the second valve assembly defines a second pivot axis when the actuator arm is in the isolate position.

8. The valve stack assembly of claim 7, wherein the first pivot axis is offset from the second pivot axis.

9. The valve stack assembly of claim 7, wherein the first pivot axis is axially aligned with the second pivot axis.

10. The valve stack assembly of claim 1, wherein the end block defines a pump orifice and a tank orifice, wherein the pump orifice and the tank orifice are fluidly coupled to the first plurality of fluid passageways and the second plurality of fluid passageways.

11. A work machine, comprising:
    a chassis and a power system for powering the machine;
    a cabin coupled to the chassis, the cabin having a back portion and a front portion;
    at least one operator control disposed in the cabin for controlling a function of the machine;

a valve stack assembly coupled to the operator control, the valve stack assembly comprising:
  a first valve assembly having at least one valve and defining a first plurality of fluid passageways;
  a second valve assembly having at least one valve and defining a second plurality of fluid passageways; and
  an end block defining a third plurality of fluid passageways, the end block being mechanically and fluidly coupled to the first valve assembly and the second valve assembly, such that the third plurality of fluid passageways fluidly couples the first plurality of fluid passageways and the second plurality of fluid passageways to one another;
  wherein, the first valve assembly is disposed along a first valve axis and the second linear valve assembly is disposed along a second valve axis;
  further wherein, the first valve axis is offset from the second valve axis;
at least one implement fluidly coupled to the valve, the implement being movable between a first position and a second position;
wherein the implement is operably controlled between the first position and the second position by the operator control.

12. The work machine of claim 11, wherein the first valve assembly is disposed towards the back portion of the cabin and the second valve assembly is disposed towards the front portion of the cabin.

13. The work machine of claim 12, wherein the first valve assembly and the second valve assembly are mechanically coupled to one side of the end block.

14. The work machine of claim 13, wherein the first valve assembly extends from the end block to define a first width that terminates at a first end and the second valve assembly extends from the end block to define a second width that terminates at a second end, where the first width and second width are different from one another.

15. The work machine of claim 11, further comprising a floor of the cabin, wherein at least one side of the floor tapers inwardly from the back portion to the front portion of the cabin.

16. The work machine of claim 15, wherein the valve stack assembly is mechanically coupled to the floor adjacent to the tapered side thereof.

17. The work machine of claim 15, wherein the valve stack assembly is mechanically coupled outside of the cabin and to an underside of the floor.

18. The work machine of claim 11, wherein the first linear valve assembly has at least one more valve then the second linear valve assembly.

19. A work machine, comprising:
a chassis and a power system for powering the machine;
a cabin coupled to the chassis, the cabin having a floor with side edges, a back portion and a front portion, wherein the side edges taper inwardly from the back portion to the front portion;
at least one operator control disposed in the cabin for controlling a function of the machine;
a first valve stack assembly coupled to the operator control, the valve stack assembly comprising:
  a first valve assembly having at least one valve and defining a first plurality of fluid passageways;
  a second valve assembly having at least one valve and defining a second plurality of fluid passageways; and
  an end block defining a third plurality of fluid passageways, the end block being mechanically and fluidly coupled to the first valve assembly and the second valve assembly, such that the third plurality of fluid passageways fluidly couples the first plurality of fluid passageways and the second plurality of fluid passageways to one another;
  wherein, the first valve assembly defines a first valve axis and the second linear valve assembly defines a second valve axis;
  further wherein, the first valve axis is offset from and parallel to the second valve axis;
at least one implement fluidly coupled to the valve, the implement being movable between a first position and a second position;
wherein the implement is operably controlled from the first position to the second position by the at least one operator control.

20. A work machine of claim 19, further comprising a second valve stack assembly, wherein the first valve stack assembly and the second valve stack assembly are coupled to a location outside of the cabin and an underside portion of the floor, further wherein the end block of each of the first and second valve stack assembly is proximate to a center portion of the floor and the first and second linear valve assemblies of both the first and second valve stack assemblies are coupled proximate to the tapered side edges.

* * * * *